(12) United States Patent
Kon et al.

(10) Patent No.: US 11,346,660 B2
(45) Date of Patent: May 31, 2022

(54) CALIBRATION METHOD OF X-RAY MEASURING DEVICE

(71) Applicant: MITUTOYO CORPORATION, Kanagawa (JP)

(72) Inventors: Masato Kon, Kanagawa (JP); Hiromu Maie, Kanagawa (JP); Seiji Sasaki, Kanagawa (JP); Jyota Miyakura, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 17/014,308

(22) Filed: Sep. 8, 2020

(65) Prior Publication Data

US 2021/0072022 A1    Mar. 11, 2021

(30) Foreign Application Priority Data

Sep. 9, 2019    (JP) .............................. JP2019-163979

(51) Int. Cl.
*G01B 15/04*    (2006.01)
(52) U.S. Cl.
CPC .................................. *G01B 15/045* (2013.01)
(58) Field of Classification Search
CPC ................................................... G01B 15/045
See application file for complete search history.

(56) References Cited

U.S. PATENT DOCUMENTS

2015/0216498 A1* 8/2015 Schulze ............... A61B 6/4435
378/19
2019/0146106 A1* 5/2019 Song ...................... A61B 6/02
378/207

FOREIGN PATENT DOCUMENTS

JP    2000-298105    10/2000

* cited by examiner

*Primary Examiner* — Hugh Maupin
(74) *Attorney, Agent, or Firm* — Greenblum & Bernstein, P.L.C.

(57) ABSTRACT

A calibration method of an X-ray measuring device includes: a front-stage feature position calculation step of parallelly moving spheres disposed in N places a plurality of times, and identifying centroid positions ImPos(1 to Q)_Dis(1 to M)_Sphr_(1 to N) of projected images of the spheres in the N places; an individual matrix calculation step of calculating an individual projection matrix PPj (j=1 to Q) for each of the spheres; an individual position calculation step of calculating moving positions Xb of the spheres on the basis of the individual projection matrix PPj (j=1 to Q); a coordinate integration step of calculating specific relative position intervals X(1 to N) of the spheres; a rear-stage feature position calculation step; a transformation matrix calculation step of calculating a projective transformation matrix Hk (k=1 to Q); a rotation detection step; a position calculation step; and a center position calculation step.

13 Claims, 8 Drawing Sheets

CALIBRATION METHOD OF X-RAY MEASURING DEVICE

CROSS-REFERENCE TO RELATED APPLICATION

The disclosure of Japanese Patent Application No. 2019-163979 filed on Sep. 9, 2019 including specifications, drawings and claims is incorporated herein by reference in its entirety.

TECHNICAL FIELD

The present invention relates to calibration methods of an X-ray measuring device, and particularly relates to a calibration method of an X-ray measuring device, the method allowing calculation of, for example, a rotation center position of a rotating table on which an object to be measured is rotatably mounted, even when a calibration tool is deformed due to secular change or the like.

BACKGROUND ART

Conventional X-ray measuring devices (measurement X-ray CT apparatus), which can measure a three-dimensional shape of an object to be measured with use of an X-ray, are mainly used for observation and inspection of defects, such as voids in casting parts, welding defects in welded parts, and defects in circuit patterns of electronic circuit parts, which are difficult to identify from external appearance. However, in recent years, with the spread of 3D printers, there are increasing demands for 3D measurement of internal dimensions of workpieces with higher accuracy. To meet these demands, the X-ray measuring devices are expected to further increase the accuracy of dimension measurement.

In order to perform more accurate dimension measurement in the X-ray measuring devices, it is important, as disclosed in Japanese Patent Application Laid-Open No. 2000-298105, to perform various calibration specific to each device, with use of a calibration tool prior to the start of measurement. Accordingly, it is desirable to constantly keep the calibration tool in a correct shape.

SUMMARY OF INVENTION

Technical Problem

However, there are cases where the calibration tool is deformed due to secular change or the like depending on management conditions. In such cases, when various calibration characteristic to each device is performed with the deformed calibration tool before the start of measurement, the measurement accuracy may deteriorate.

The present invention has been made in order to solve the above-described problems in the conventional technique, and an object thereof is to provide a calibration method of an X-ray measuring device, the method allowing calculation of, for example, a rotation center position of a rotating table on which an object to be measured is rotatably mounted, even when a calibration tool is deformed due to secular change or the like.

Solution to Problem

In order to accomplish the above-stated object, a first aspect of the present invention provides a calibration method of an X-ray measuring device configured to measure a three-dimensional shape of an object to be measured using an X-ray. The X-ray measuring device includes an X-ray source that generates an X-ray, a rotating table on which the object to be measured is rotatably mounted, and an X-ray image detector that detects the X-ray passing through the object to be measured. The method includes: a mounting step of mounting on the rotating table a calibration tool that allows disposition of reference objects in N places (N≥4) at specific relative positional intervals, the reference objects having a shape that is identifiable by projected images on the X-ray image detector; a front-stage feature position calculation step of parallelly moving the reference objects disposed in the N places a plurality of times without changing the specific relative positional intervals of the reference objects, irradiating the calibration tool with the X-ray before and after the parallel movement, and identifying positions of feature points of projected images of the reference objects in the N places from an output of the X-ray image detector; an individual matrix calculation step of calculating an individual transformation matrix for each of the reference objects in the N places from the positions before and after the parallel movement and the corresponding positions of the feature points of the projected images of the reference objects in the N places, the individual transformation matrix being used for projective transformation of the reference objects to a detection surface of the X-ray image detector; an individual position calculation step of calculating moving positions of the reference objects in the N places on the basis of the individual transformation matrix; a coordinate integration step of adding moving positions of the reference objects in the N places to each of the positions before and after the parallel movement, and calculating the specific relative position intervals of the reference objects in the N places; a rear-stage feature position calculation step of irradiating the calibration tool with an X-ray, and identifying positions of feature points of projected images of the reference objects in the N places from an output of the X-ray image detector; a transformation matrix calculation step of calculating a first transformation matrix from the positions of the feature points of the projected images of the reference objects in the N places and the specific relative positional intervals, the first transformation matrix being used for projective transformation of the reference objects onto a detection surface of the X-ray image detector; a rotation detection step of rotating the rotating table twice or more at a predetermined angle, and repeating execution of the rear-stage feature position calculation step to the transformation matrix calculation step; a position calculation step of calculating absolute positions of the reference objects for each rotation at the predetermined angle on the basis of the first transformation matrix; and a center position calculation step of calculating a rotation center position of the rotating table from change in the absolute positions of the reference objects caused by rotation of the rotating table.

A second aspect of the present invention provides the correction method in which, in the individual matrix calculation step, on assumption that the X-ray source and the X-ray image detector are parallelly moved instead of the reference objects disposed in the N places, a moving position of the X-ray source may be calculated for each N place on the basis of the individual transformation matrix, and the moving positions of the reference objects in the N places may be calculated on the basis of the moving position of the X-ray source.

A third aspect of the present invention provides the calibration method in which, in the coordinate integration step, results of adding the moving positions of the reference objects in the N places to the positions before and after the parallel movement may be defined as modified moving positions, and from the positions of the feature points of the projected images of the reference objects in the N places and the modified moving positions, a second transformation matrix may be calculated so as to calculate the specific relative position intervals of the reference objects in the N places, the second transformation matrix being used for projective transformation of the reference objects onto the detection surface of the X-ray image detector.

A fourth aspect of the present invention provides the calibration method in which, in the coordinate integration step, the calculated modified moving positions and the calculated second transformation matrix may be set as initial values of the modified moving positions and the second transformation matrix that are used as variables, and a position error between the positions of the feature points of the projected images of the reference objects in the N places, calculated on the basis of relationship between the modified moving positions and the second transformation matrix, and positions of the feature points of the projected images of the reference objects in the N places that are actually detected may be evaluated so as to calculate the modified moving positions and the second transformation matrix.

A fifth aspect of the present invention provides the calibration method in which the rotating table may be rotated a plurality of times at a specific angle, the front-stage feature position calculation step to the coordinate integration step may be repeatedly executed, and an average of the plurality of specific relative position intervals obtained by the repeated execution may be calculated, or positions before and after the parallel movement when the steps are repeatedly executed next time may be associated with the specific relative position intervals calculated immediately before.

A sixth aspect of the present invention provides the calibration method in which, when all the reference objects are mounted on only one plane in the calibration tool, the first transformation matrix may be defined as a projective transformation matrix, and when the reference objects are mounted three-dimensionally, the first transformation matrix may be defined as a projection matrix.

A seventh aspect of the present invention provides the calibration method in which, in the center position calculation step, a rotary axis of the rotating table may further be calculated.

An eighth aspect of the present invention provides the calibration method in which, in the position calculation step, on an assumption that the X-ray source and the X-ray image detector rotate instead of the rotating table, absolute positions of the reference objects may be calculated by calculating an absolute position of the X-ray source for each rotation at the predetermined angle on the basis of the first transformation matrix and by transforming the absolute position of the X-ray source into coordinates.

A ninth aspect of the present invention provides the calibration method in which, when the absolute position of the X-ray source is calculated by rotating the rotating table three times or more at the predetermined angle, a distance between the X-ray source and the X-ray image detector and a position of a foot of a perpendicular from the X-ray source to the X-ray image detector may be converted into variables, and a distance error between a position on a locus of a provisional true circle and the absolute position of the X-ray source may be evaluated so as to calculate the distance between the X-ray source and the X-ray image detector and a position of the foot of the perpendicular from the X-ray source to the X-ray image detector, the provisional true circle being obtained by fitting the absolute positions of the X-ray source calculated on the basis of the first transformation matrix to a true circle.

A tenth aspect of the present invention provides the calibration method in which, in the center position calculation step, a center position of a locus obtained by fitting change in the absolute positions of the reference objects to a true circle may be calculated, and the calculated center position may be defined as the rotation center position of the rotating table.

An eleventh aspect of the present invention provides the calibration method in which, in calculation of the rotary axis of the rotating table, an angle of inclination from a horizontal plane of the locus may further be calculated, and the rotary axis may be calculated from the angle of inclination and the rotation center position.

A twelfth aspect of the present invention provides the calibration method in which, the reference objects may each be a sphere.

A thirteenth aspect of the present invention provides the calibration method in which the positions of the feature points of the projected images of the reference objects may be centroid positions of the projected images.

Advantageous Effects of Invention

According to the present invention, it becomes possible to calculate, for example, a rotation center position of a rotating table, on which an object to be measured that is rotatably mounted, even when a calibration tool is deformed due to secular change or the like.

These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein.

DESCRIPTION OF EMBODIMENTS

Hereinafter, an embodiment of the present invention will be described in details with reference to the drawings. The present invention is not limited by the contents of the embodiment and examples described below. Moreover, component members described hereinbelow include those easily conceived by a person skilled in the art and those substantially identical, i.e., their full scope of equivalents. Furthermore, the component members disclosed hereinbelow can appropriately be combined or selected where necessary.

Figure 1:
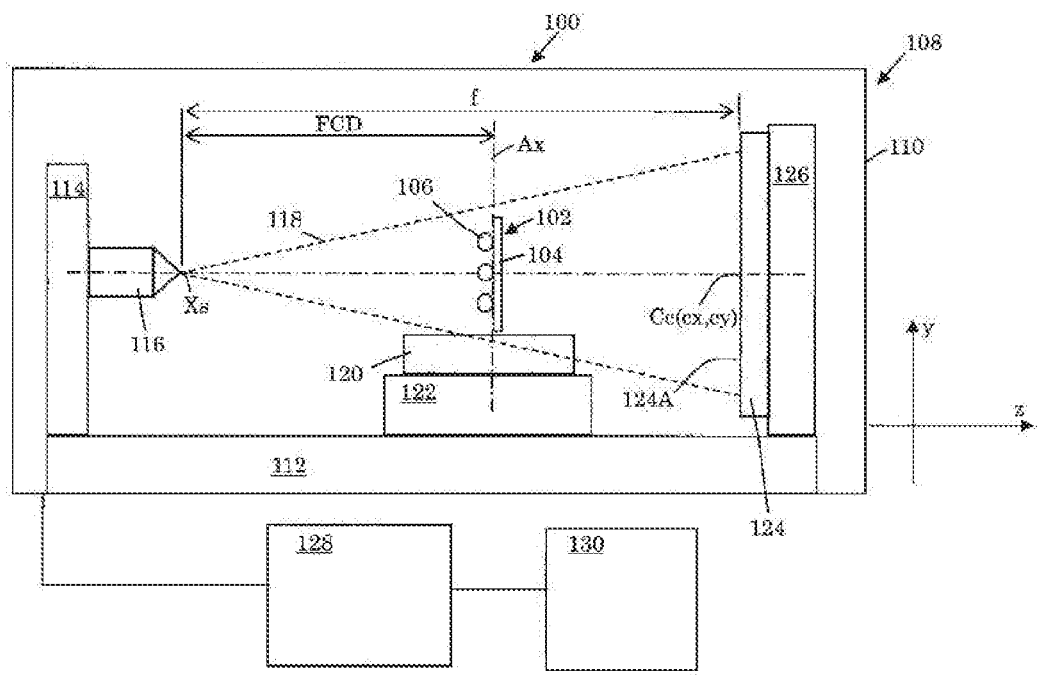
FIG. 1 is a schematic side view showing a basic configuration of an X-ray measuring device according to an embodiment of the present invention.

FIG. 1 shows a first embodiment of the present invention. In FIG. 1, a description is given on the assumption that a width direction with respect to the page of FIG. 1 is a z-axis direction, a longitudinal direction with respect to the page is a y-axis direction, and a direction perpendicular to the page is an x-axis direction.

An X-ray measuring device 100 is a device for measuring a three-dimensional shape of an object to be measured with an X-ray. As shown in FIG. 1, the X-ray measuring device 100 includes a body unit 108, a host computer 128, and a motion controller 130.

Figure 2:
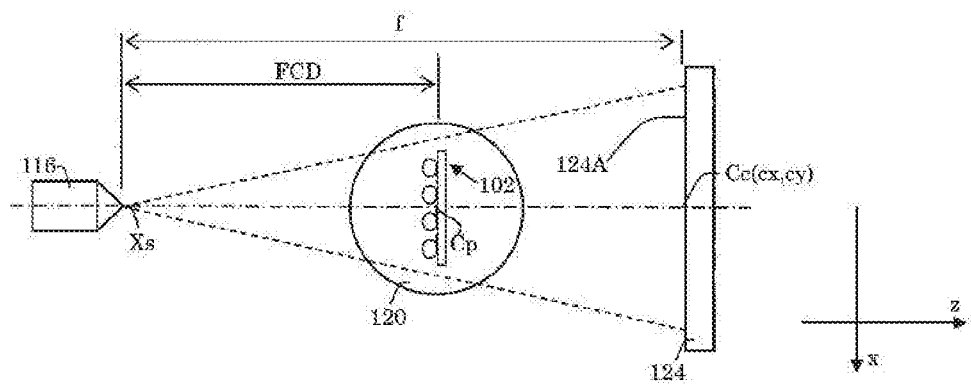
FIG. 2 is a schematic top view showing only essential parts of the X-ray measuring device of FIG. 1.
Figure 3A:
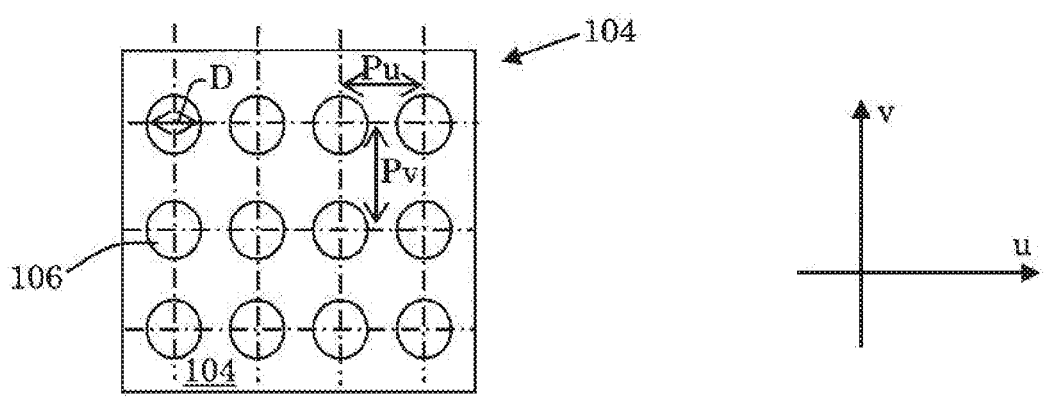
FIG. 3A is a front view showing a calibration tool of FIG. 1.
Figure 3B:
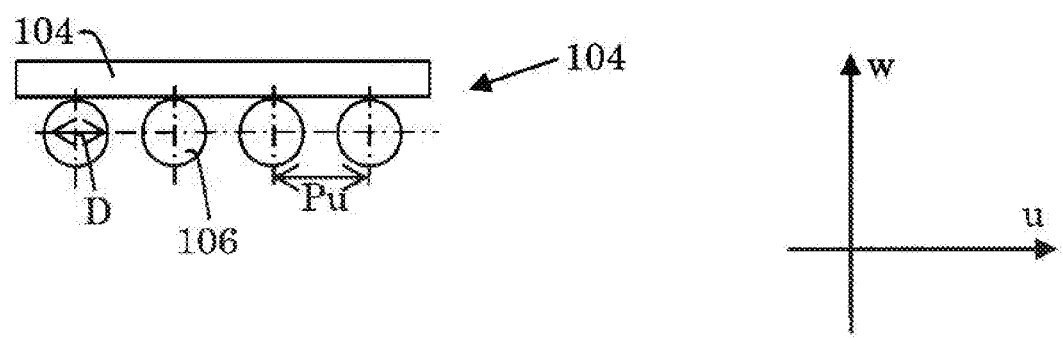
FIG. 3B is a top view showing the calibration tool of FIG. 1.

In FIGS. 1 and 2, a calibration tool 102 instead of an object to be measured is mounted on a rotating table 120. The calibration tool 102 is made of a material (for example, aluminum etc.) which can transmit an X-ray 118 as shown in FIG. 3A and FIG. 3B. It is assumed that the calibration tool 102 is used to include a plurality of (for example, the number (N) is 4*3=12 although the number N takes any number as long as N 4 is satisfied) spheres (reference objects) 106 having a diameter D provided at fixed relative positional intervals on a planar member 104 (i.e., the spheres 106 are disposed in N places at relative positional intervals (which are also referred to as relative positions)). However, although the fixed relative positional intervals are used to be known, it is assumed that the calibration tool 102 has deformed due to secular change, and the positions of all the spheres 106 are now shifted from the fixed relative positional intervals (i.e., in FIGS. 3A and 3B, specific relative positional intervals Pu, Pv are unknown and are no longer fixed). At this point of time, it can be said that the relative positions X(1 to N) of the N spheres 106, in other words, the spheres 106 in N places, are unknown (relative positions X(1 to N) are identical to X1 to XN; this applies in the description below). However, in the present embodiment, it is assumed that all the spheres 106 are mounted on only one plane in the calibration tool 102. The spheres 106 have a simple shape which can easily be identified by their projected images onto an X-ray image detector 124. In FIG. 3A, a width direction with respect to the page of FIG. 1 is a u-axis direction, a longitudinal direction with respect to the page is a v-axis direction, and a direction perpendicular to the page is a w-axis direction.

The calibration tool 102 includes a triaxial linear motion stage which moves the planar member 104 in the direction of three axes x, y, and z. Accordingly, the calibration tool 102 can freely perform parallel movement of the spheres 106 disposed in N places without changing the specific relative positional intervals of the spheres 106 each other (without being limited thereto, the rotating table 120 may include the triaxial linear motion stage). When the calibration tool 102 is mounted on the rotating table 120, and is irradiated with the X-ray 118 at the position where the triaxial linear motion stage is not moved (the position before parallel movement), the position of the rotating table 120 is referred to as a first table position Dis1. Then, when the calibration tool 102 is irradiated with the X-ray 118 at the position where the triaxial linear motion stage is moved (the position after the parallel movement), the position of the rotating table 120 is referred to as a second table position Dis2. In short, the positions of the rotating table 120 before and after all the parallel movements are referred to as the table positions Dis(1 to M), and the positions before and after an i-th(1≤i≤M) parallel movement is referred to as a table position Disi. In the present embodiment, M=N, i.e., M=12.

As shown in FIG. 1, the body unit 108 includes, on the base 112, an X-ray shielding cover 110 to prevent leakage of the X-ray 118, an X-ray source 116 to generate the X-ray 118, the rotating table 120 on which an object to be measured (not illustrated) is rotatably mounted, and the X-ray image detector 124 to detect the X-ray 118 that passes through the object to be measured. The X-ray source 116 is provided on an X-ray source support stand 114 on the base 112. The X-ray source support stand 114 can include a linear motion mechanism which can move the X-ray source 116 in three axial directions of x, y, and z. The rotating table 120 is provided on a table support stand 122 on the base 112. The table support stand 122 includes a linear motion mechanism which can move the object to be measured in three axial directions of x, y, and z. The table support stand 122 may further be provided with an inclination mechanism which can adjust inclination of a rotary axis Ax of the rotating table 120. The X-ray image detector 124 has a two-dimensional detection surface 124A that is sensitive to the X-ray 118. The X-ray image detector 124 is supported by a detector support stand 126 on the base 112. The detector support stand 126 may also include a linear motion mechanism which can move the X-ray image detector 124 in three axial directions of x, y, and z. A radiation beam of the X-ray 118 from the X-ray source 116 conically spreads in the z-axis direction, with its center line being adjusted so as to be orthogonal to the rotary axis Ax of the rotating table 120 and constitute a perpendicular of the detection surface 124A of the X-ray image detector 124.

The host computer 128 shown in FIG. 1 controls the X-ray source support stand 114, the X-ray source 116, the rotating table 120, the table support stand 122, the X-ray image detector 124, and the detector support stand 126 of the body unit 108. The host computer 128 can also read and execute programs stored in a storage unit, which is not illustrated, to perform automatic or semiautomatic measuring operation and calibration of the X-ray measuring device 100. In other words, in the measuring operation of the X-ray measuring device 100, the host computer 128 reconstructs, for example, data on the projected images obtained by the X-ray image detector 124, and creates three-dimensional volume data on the object to be measured.

Then, in calibration of the X-ray measuring device 100, on the assumption that the X-ray source 116 and the X-ray image detector 124 parallelly move instead of the spheres 106 disposed in the N places, the host computer 128 can calculate the moving position Xm of the X-ray source 116 corresponding to each of the spheres 106, with use of, for example, the relationship expressed by a series of expressions below on the basis of an (3 rows*4 columns) individual projection matrix (individual transformation matrix) PPj (j=1 to N) related to all the table positions Dis(1 to M).

Specifically, first of all, an internal parameter matrix A expressed by an expression (1) is defined from a distance f between the X-ray source 116 and the X-ray image detector 124, and a position Cc (cx, cy) of a foot of a perpendicular from the X-ray source 116 to the X-ray image detector 124. When an aspect ratio of pixels in the X-ray image detector 124 differs, the distance f in the first row first column and the distance f in the second row second column in the internal parameter matrix A are slightly different in value from each other. While a skew S related to distortion of an image may be used for the first row second column in the internal parameter matrix A, the skew S is set to zero in the present embodiment.

$$A = \begin{bmatrix} f & 0 & cx \\ 0 & f & cy \\ 0 & 0 & 1 \end{bmatrix} \quad (1)$$

At the time, a rotation matrix Rj for a j-th (1≤j≤N) sphere 106 is made of 3 rows*3 columns which are constituted of three column vectors rj1, rj2, and rj3. The rotation matrix Rj can be expressed as an expression (2).

$$Rj=[rj1 rj2 rj3] \quad (2)$$

Here, the individual projection matrix PPj for the j-th sphere 106 can be decomposed as in an expression (3) by using a translation matrix Tj for the j-th sphere 106 (translation vectors of one column), and the expressions (1) and (2).

$$PPj=A[rj1 rj2 rj3 Tj] \quad (3)$$

From the expression (3), the moving position Xm of the X-ray source 116 with respect to the j-th sphere 106 can be calculated as expressed by an expression (4). Note that a reference sign−inv( ) represents an inverse matrix.

$$Xm=-inv(Rj)*Tj \quad (4)$$

Here, the moving position Xm of the X-ray source 116 with respect to the j-th sphere 106 is regarded as a moving position=Xb of the j-th sphere 106.

Specifically, on the assumption that the X-ray source 116 and the X-ray image detector 124 parallelly move instead of the spheres 106 disposed in the N places, the host computer 128 can calculate the moving position Xm of the X-ray source 116 for each sphere 106 on the basis of the individual projection matrix PPj, and can calculate the moving positions Xb of the spheres 106 in the N places on the basis of the moving position Xm of the X-ray source 116.

Furthermore, the host computer 128 adds to each of the table positions Dis(1 to M) the moving positions Xm of the spheres 106 in the N places, and thereby integrates the coordinates of the spheres 106 into the same coordinate system. This makes it possible to calculate the relative positions X(1 to N) of the spheres 106 in the N places.

Specifically, first, as shown by an expression (5), the results of adding the moving positions Xb of the spheres 106 in the N places to each of the table positions Dis(1 to M) are defined as modified moving positions Xl.

$$Xl=Dis(1 \text{ to } M)+Xb \quad (5)$$

Then, from centroid positions ImDis(1 to M)_Sphr_(1 to N) of projected images of the spheres 106 in the N places (when the number of the spheres 106 is N in M table positions Dis(1 to M)) and the modified moving positions Xl, a projection matrix (second transformation matrix) P used for projective transformation of the spheres 106 to the detection surface 124A of the X-ray image detector 124 is calculated. Since the projection matrix P is substantially identical to the individual projection matrix PPj expressed in the expression (3), the description thereof is omitted.

Then, the host computer 128 calculates the relative positions X(1 to N) of the spheres 106 in the N places from the projection matrix P.

Figure 10A:
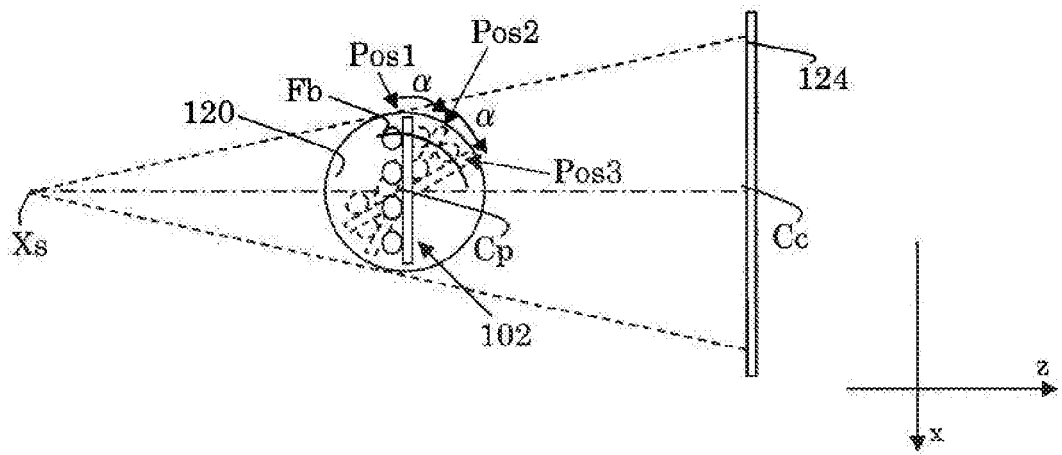
FIG. 10A shows the relationship between the absolute positions of the spheres and the absolute position of the X-ray source, in which the rotating table rotates.
Figure 10B:
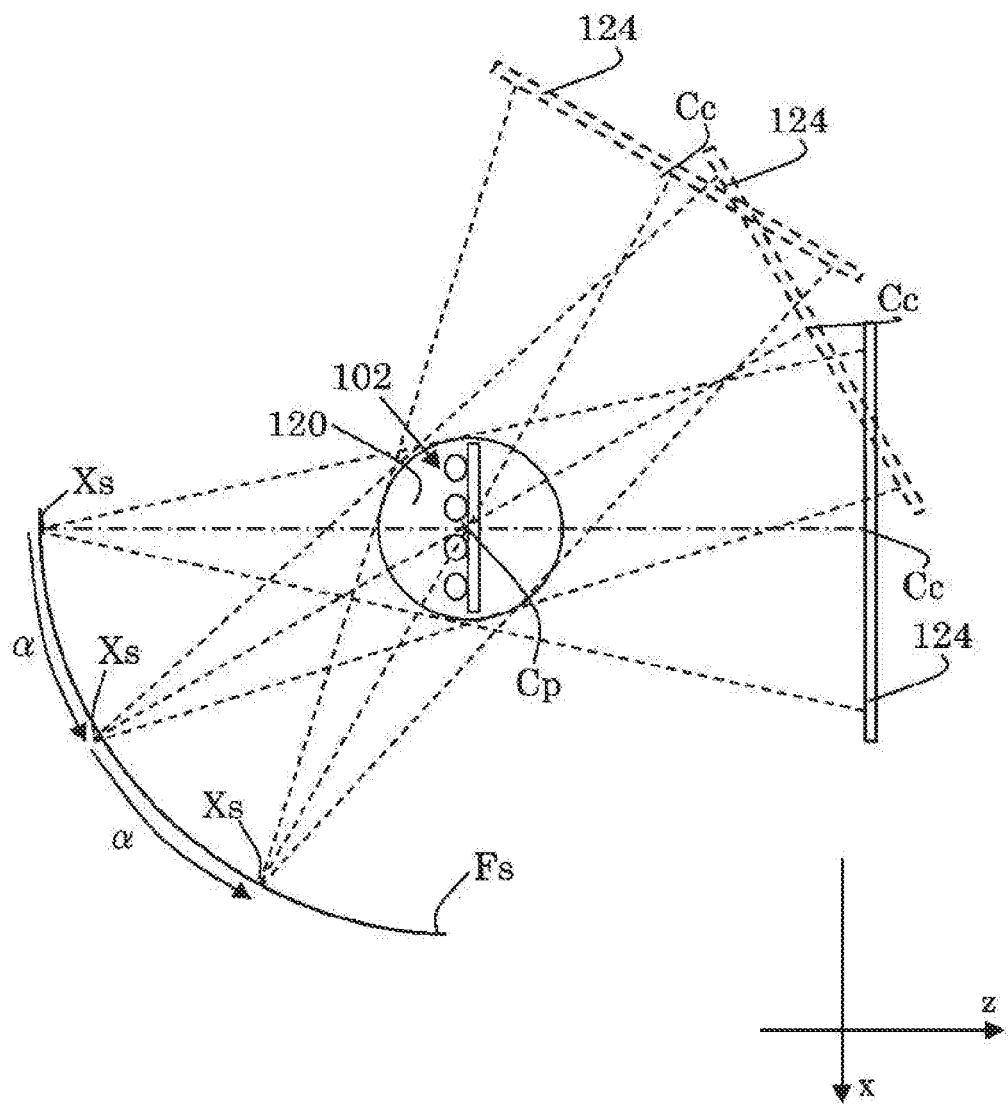
FIG. 10B shows the relationship between the absolute positions of the spheres and the absolute position of the X-ray source, in which the X-ray source and the X-ray image detector are assumed to rotate.

On the assumption that instead of the rotating table 120, the X-ray source 116 rotates on the basis of a projective transformation matrix (first transformation matrix) Hk made of 3 rows*3 columns in a k-th rotational position Posk of the rotating table 120, the host computer 128 can calculate the absolute position Xs of the X-ray source 116 in the k-th assumed rotational position (FIGS. 10A and 10B).

Specifically, in the internal parameter matrix A of the expression (1), the rotation matrix Rk of the k-th assumed rotational position can be expressed as an expression (6) on the basis of the expression (2).

$$Rk=[rk1 rk2 rk3] \quad (6)$$

Here, the projective transformation matrix Hk can be decomposed as in an expression (7) by using a translation matrix Tk in the k-th assumed rotational position (translation vectors of one column), and the expressions (1) and (6).

$$Hk=[rk1 rk2 Tk] \quad (7)$$

From the expression (7), the absolute position Xs of the X-ray source 116 in the k-th assumed rotational position can be calculated as expressed in an expression (8).

$$Xs=-inv(Rk)*Tk \quad (8)$$

The host computer 128 can also calculate the absolute positions Xa(1 to N) of the spheres 106 in a k-th rotational position Posk by performing coordinate transformation of the absolute position Xs of the X-ray source 116 in the k-th assumed rotational position.

The host computer 128 can also calculate the rotation center position Cp of the rotating table 120 from change in the absolute positions Xa(1 to N) of the spheres 106 caused by rotation of the rotating table 120.

When the distance f between the X-ray source 116 and the X-ray image detector 124 and the position Cc of the foot of the perpendicular from the X-ray source 116 to the X-ray image detector 124 are unknown, the host computer 128 utilizes the distance f and the position Cc as variables, substitutes appropriate values into the variables, and calculates the absolute positions Xs of the X-ray source 116 in Q places by using the expression (8), that is, on the basis of the projective transformation matrix Hk (k=1 to Q). The host computer 128 fits the calculated absolute positions Xs of the X-ray source 116 in the Q places to a true circle (provisional true circle) by, for example, a least square method. The host computer 128 then evaluates a distance error between the positions on a locus of the provisional true circle and the absolute positions Xs of the X-ray source 116 in the Q places, and calculates the distance f and the position Cc having the least distance error. In this case, the total number Q of the rotational positions is three or more, that is, the rotating table 120 is rotated three times or more at a predetermined angle α.

The motion controller 130 shown in FIG. 1, which is connected to the host computer 128, controls the X-ray source 116, rotation and movement of the rotating table 120, and various mechanisms of the body unit 108.

Next, the measuring operation of the X-ray measuring device 100 will briefly be described.

In measuring operation, the object to be measured is rotated on the rotating table 120 in the state where the X-ray 118 is generated, and projected images are collected from a plurality of angular directions (the number of angle divisions being, for example, about 1000 to 6000). The collected projected images are subjected to reconstruction processing with a slice surface horizontally crossing the object to be measured as a datum level, so as to create three-dimensional volume data (three-dimensional images) of the object to be measured.

Next, the calibration procedure of the X-ray measuring device 100 will be described with reference to FIGS. 4 to 8. Here, the host computer 128 performs all the arithmetic calculation processes. Note that, for example, when i=1, the i-th table position Disi represents the table position Dis1. When the number of the spheres 106 is N in the M table positions Dis(1 to M), the centroid positions ImDis(1 to M)_Sphr_(1 to N) represent the centroid positions ImDis1_Sphr_1 to ImDisM_Sphr_N of total M*N spheres 106. When k=1, the k-th rotational position Posk represents a rotational position Pos1. When the number of the spheres 106 is N in the k-th rotational position Posk, the centroid positions ImPosk_Sphr_(1 to N) represent centroid positions ImPosk_Sphr_1 to ImPosk_Sphr_N of N spheres 106 in the k-th rotational position Posk.

Figure 4:
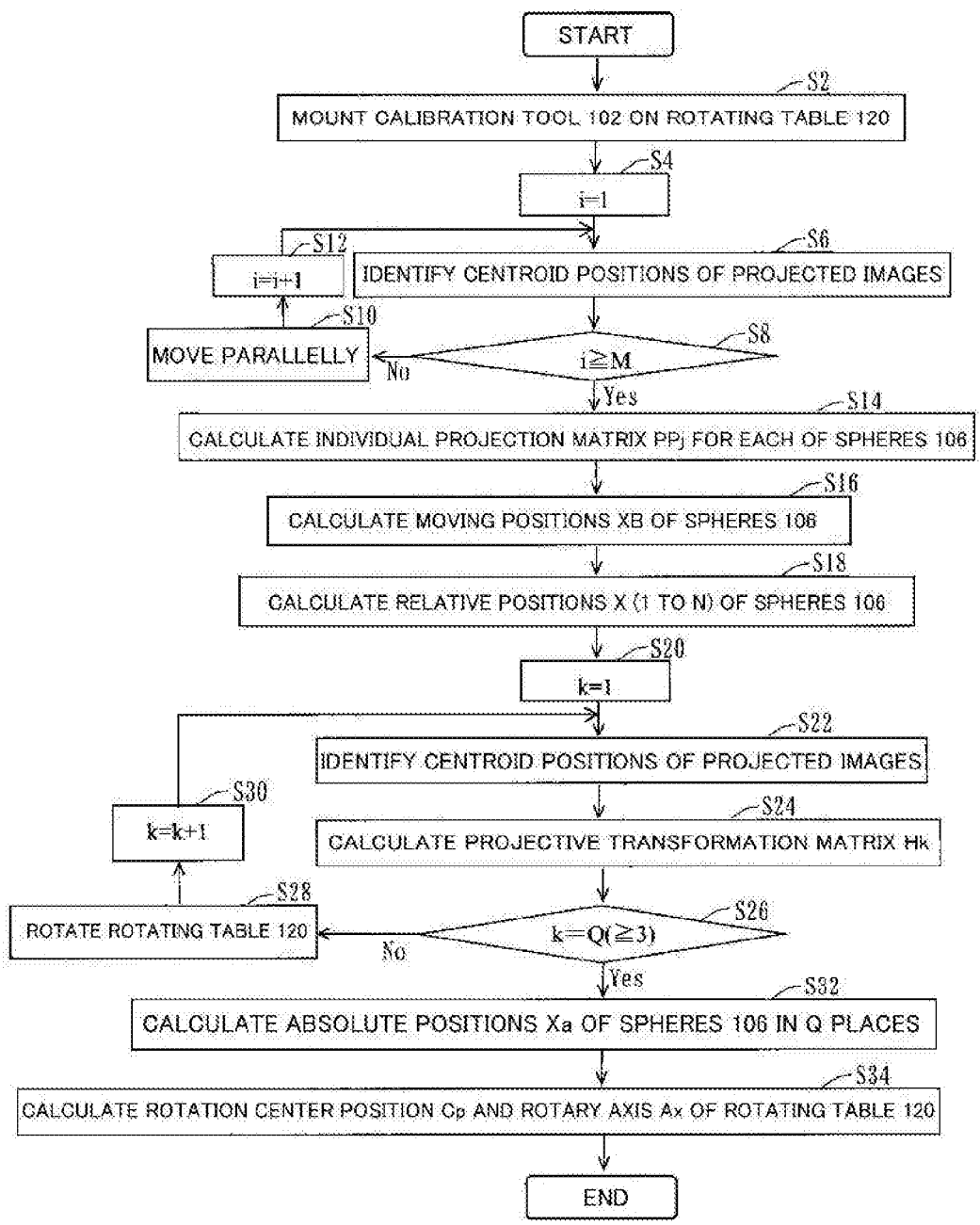
FIG. 4 is a flowchart showing calibration procedures of the X-ray measuring device according to the embodiment of the present invention.

First, the calibration tool 102 including the plurality of spheres 106 at specific relative positional intervals is mounted on the rotating table 120 (step S2 of FIG. 4; mounting step). The state where the parallel movement is not performed is defined as I=1 (step S4 of FIG. 4).

Next, the calibration tool 102 is irradiated with the X-ray 118. From an output of the X-ray image detector 124, the centroid positions (positions of feature points) ImDis-i_Sphr_(1 to N) of the projected images of N (N=12) spheres 106 are identified (step S6 of FIG. 4). At the time, the i-th table position Disi is recorded.

Next, it is determined whether the number i of the table positions Disi is equal to or more than M (step S8 of FIG. 4). When the number i of the table positions Disi is not equal to or more than M (M=12) (No in step S8 of FIG. 4), the spheres 106 disposed in the N places are parallelly moved without changing the specific relative positional intervals of the spheres 106 (step S10 of FIG. 4). Then, the number i of the table positions Disi is incremented by 1 (step S12 of FIG. 4), and steps S6 and S8 are repeated (steps S6 to S12; front-stage feature position calculation step). That is, in the front-stage feature position calculation step, the spheres 106 disposed in the N places are parallelly moved (M-1) times without changing the specific relative positional intervals of the spheres 106. Before and after the parallel movement, the calibration tool 102 is irradiated with the X-ray 118 M times, and the centroid positions ImDis(1 to M)_Sphr_(1 to N) of the projected images of the spheres 106 in the N places are each identified from the output of X-ray image detector 124.

When the number i of the table positions Disi becomes equal to or more than M (=12) (Yes in step S8 of FIG. 4), the process proceeds to step S14.

Next, from each of the table positions Dis (1 to M) and the corresponding centroid positions ImDis(1 to M)_Sphr_(1 to N) of the projected images of the spheres 106 in the N places an individual projection matrix ppj used for projection transformation of the spheres 106 to the detection surface 124A of the X-ray image detector 124 is calculated for each of the spheres 106 in the N places (step S14 of FIG. 4; individual matrix calculation step).

Next, on the basis of the individual projection matrix PPj, the moving positions Xb of the spheres 106 in the N places are calculated (step S16 of FIG. 4; individual position calculation step). The detail of the step will be described later.

Next, the relative positions X(1 to N) of the spheres 106 in the N places are calculated by adding the moving positions Xb of the spheres 106 in the N places to each of the table positions Dis(1 to M) (step S18 of FIG. 4; coordinate integration step). The detail of the step will also be described later.

Next, the state where the rotating table 120 does not yet rotate is set to k=1 (step S20 of FIG. 4). Then, the calibration tool 102 is irradiated with the X-ray 118. From the output of X-ray image detector 124, the centroid positions ImPosk-_Sphr_(1 to N) of the projected images of the spheres 106 in the N places are identified, respectively (step S22 of FIG. 4; rear-stage feature position calculation step).

Next, from the centroid positions ImDis(1 to M)_Sphr_(1 to N) of the projected images of the spheres 106 in the N places and the relative positions X(1 to N) of the spheres 106, a projective transformation matrix Hk used for projective transformation of the spheres 106 to the detection surface 124A of the X-ray image detector 124 is calculated (step S24 of FIG. 4; transformation matrix calculation step).

Next, it is determined whether the number k of the rotational positions Posk is equal to or more than Q (the number k may be three or more in the present embodiment) (step S26 of FIG. 4). When the number k of the rotational positions Posk is not equal to or more than Q (Q 3) (No in step S26 of FIG. 4), the rotating table 120 is rotated at a predetermined angle α (step S28 of FIG. 4). Then, the number k of the rotational positions Posk is incremented by 1 (step S30 of FIG. 4), and step S22 and step S24 are repeated (step S22 to step S30; rotation detection step). When the number k of the rotational positions Posk becomes equal to or more than Q (Q 3) (Yes in step S26 of FIG. 4), the process proceeds to step S32. In other words, in the rotation detection step, the rotating table 120 is rotated twice or more at the predetermined angle α, and execution of the rear-stage feature position calculation step to the transformation matrix calculation step is repeated. In the present embodiment, although the predetermined angle α is fixed to, for example, 30 degrees, the angle is not limited in particular. The predetermined angle α may be a smaller angle, or take a different value every time.

Next, on the basis of the projective transformation matrix Hk (k=1 to Q), absolute positions Xa(1 to N) of the spheres 106 (Q places) for each rotation at the predetermined angle α are calculated (step S32 of FIG. 4; position calculation step). The detail of the step will also be described later.

Next, from change in absolute positions Xa(1 to N) of the spheres 106 in Q places caused by rotation of the rotating table 120, the rotation center position Cp and the rotary axis Ax of the rotating table 120 are calculated (step S34 of FIG. 4; center position calculation step). In this step, first, a center position Cp of a locus Fb, obtained by fitting each of the change in the absolute positions Xa(1 to N) of the spheres 106 to a true circle, is calculated, and the obtained center position Cp is set as the rotation center position Cp of the rotating table 120. More specifically, the absolute positions Xa(1 to N) of the spheres 106 in the Q places are each fitted to a true circle. If Q>3 at the time, the center position Cp of the true circle is calculated by, for example, the least square method. If Q=3, the center position Cp of the true circle is calculated by, for example, a simultaneous equation.

Then, for instance, an angle of inclination from a horizontal plane (xz plane) of the locus Fb obtained by fitting to a true circle is calculated. Then, the rotation center position Cp and the rotary axis Ax of the rotating table 120 are calculated. In this case, in each of 12 (N=12) spheres 106, the center position Cp of the true circle and its locus Fb are calculated. Accordingly, the rotation center position Cp can be calculated by equalizing the center positions Cp of the true circles of the twelve spheres 106, and the angle of inclination of the rotary axis Ax can be calculated by equalizing the values of the inclination from the horizontal plane of the loci Eb of these true circles. As a result, the rotary axis Ax can be calculated.

Here, one example of the individual position calculation step will be described with reference to FIG. 5.

Figure 5:
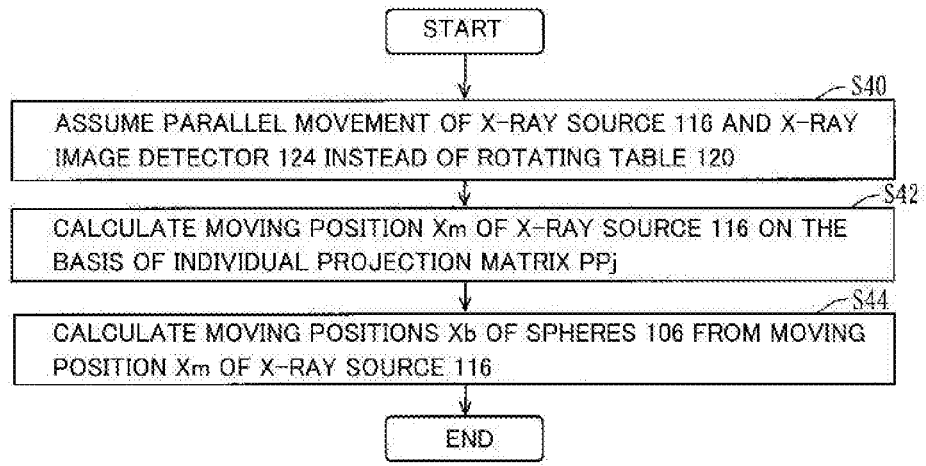
FIG. 5 is a detailed flowchart of a step of calculating moving positions of spheres in FIG. 4.

First, assume that, instead of the spheres 106 in the N places, the X-ray source 116 and the X-ray image detector 124 parallelly move (step S40 of FIG. 5).

Next, on the basis of the individual projection matrix PPj, the moving position Xm of the X-ray source 116 is calculated for each N place (step S42 of FIG. 5).

Next, on the basis of the moving positions Xm of X-ray source 116, the moving positions Xb of the spheres 106 in the N places are calculated (step S44 of FIG. 5). In the present embodiment, the moving positions Xm are regarded as the moving positions Xb.

One example of the coordinate integration step will be described with reference to FIG. 6.

Figure 6:
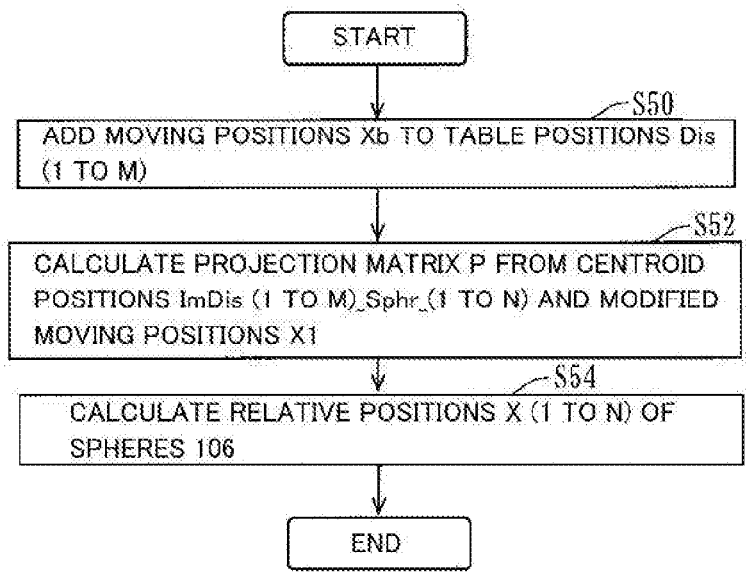
FIG. 6 is a detailed flowchart of a step of calculating relative positions of the spheres in FIG. 4.
Figure 9:
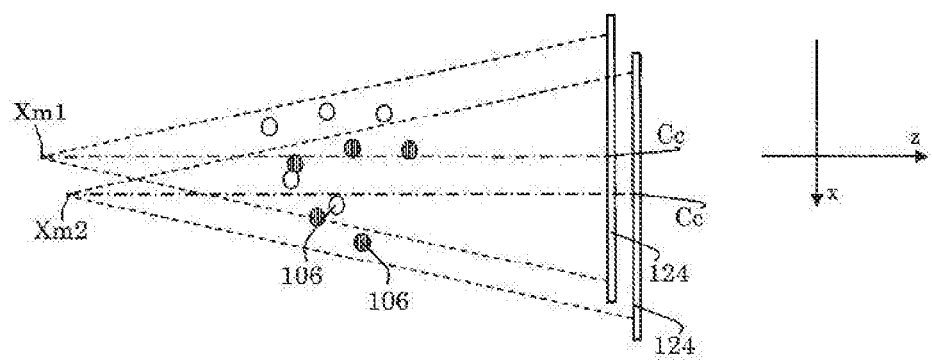
FIG. 9 is an image view showing coordinate integration performed when the relative positions of the spheres are calculated in FIG. 4.

First, the moving positions Xb of the spheres 106 in the N places are each added to the M table positions Dis(1 to M) (step S50 of FIG. 6). This results in the modified moving positions Xl. The modified moving positions Xl constitute total N*M data. FIG. 9 show images of the moving positions Xm1 and Xm2 of the X-ray source 116 when the first sphere 106 (white circles) and the second sphere 106 (pinstripe circles) parallelly move to five places.

Next, from the centroid positions ImDis(1 to M)_Sphr_(1 to N) of the projected images of the spheres 106 in the N place and the modified moving positions Xl, a projection matrix P used for projective transformation of the spheres 106 to the detection surface 124A of X-ray image detector 124 is calculated (step S52 of FIG. 6).

Next, on the basis of the projection matrix P, the relative positions X(1 to N) of the spheres 106 in the N places are calculated (step S54 of FIG. 6). At the time, when the distance f between the X-ray source 116 and the X-ray image detector 124, and the position Cc of the foot of the perpendicular from the X-ray source 116 to the X-ray image detector 124 are unknown, the distance f and the position Cc can be calculated, or the distance f and the position Cc may be calculated in the position calculation step.

One example of the position calculation step will be described with reference to FIG. 7.

Figure 7:
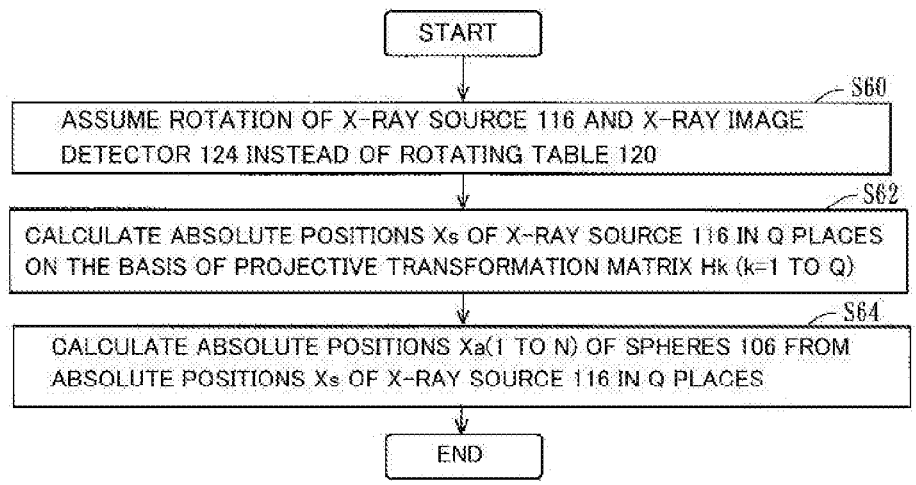
FIG. 7 is a detailed flowchart of a step of calculating absolute positions of the spheres from an absolute position of an X-ray source in FIG. 4.

First, assume that instead of the rotating table 120, the X-ray source 116 and the X-ray image detector 124 rotate (step S60 of FIG. 7). Incidentally, the predetermined angle α and the locus Fb of the sphere 106 when the rotating table 120 rotates are shown in FIG. 10A. A locus Fs of the absolute positions Xs of the X-ray source 116 when it is assumed that the X-ray source 116 and X-ray image detector 124 rotate is described in FIG. 10B.

Next, on the basis of the projective transformation matrix Hk (k=1 to Q), the absolute positions Xs of the X-ray source 116 for each rotation at the predetermined angle α, that is, in Q places are calculated (step S62 of FIG. 7).

Next, the absolute positions Xa(1 to N) of the spheres 106 in Q places are calculated by coordinate transformation of the absolute positions Xs of the X-ray source 116 in Q places (step S64 of FIG. 7).

There is a case where, when the absolute positions Xs of the X-ray source 116 in Q places are calculated in the above-described position calculation step, the distance f between the X-ray source 116 and the X-ray image detector 124 and the position Cc of the foot of the perpendicular from the X-ray source 116 to the X-ray image detector 124 are unknown. The case will be described below with reference to FIG. 8.

Figure 8:
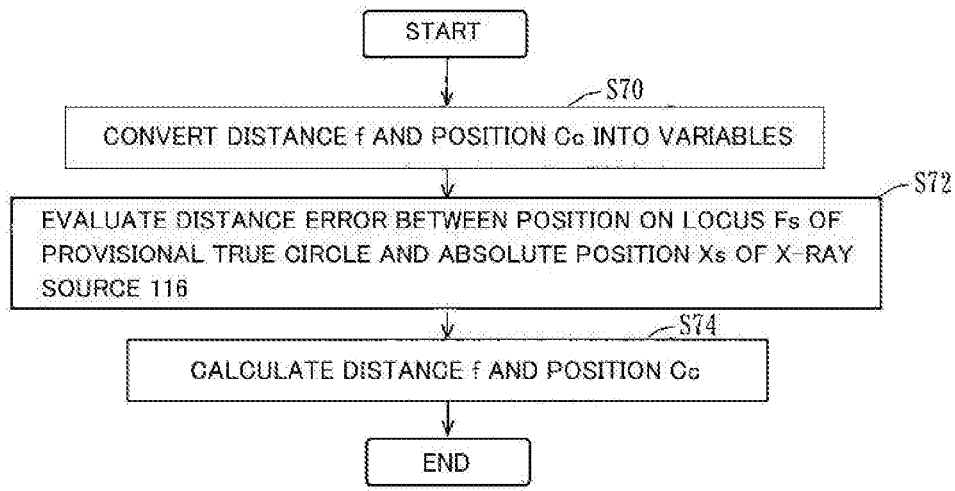
FIG. 8 is a flowchart of a step of calculating a distance between the X-ray source and the X-ray image detector, and a position of a foot of a perpendicular from the X-ray source to the X-ray image detector, after calculating the absolute position of the X-ray source in FIG. 7.

First, when the absolute position Xs of the X-ray source 116 in the k-th assumed rotational position is calculated, the distance f between the X-ray source 116 and the X-ray image detector 124, and the position Cc of the foot of the perpendicular from the X-ray source 116 to the X-ray image detector 124 are converted into variables (step S70 of FIG. 8). Then, a distance error between a position on a locus Fs of a provisional true circle, obtained by fitting the absolute positions Xs of the X-ray source 116 to a true circle, in the k-th assumed rotational position calculated on the basis of the projective transformation matrix Hk, and the absolute position Xs of the X-ray source 116 is evaluated (step S72 of FIG. 8). Then, the distance f and the position Cc which minimize the distance error are calculated (step S74 of FIG. 8).

Specifically, for example, the distance f is temporarily set to an appropriate value, and the position Cc is made to vary. In this process, the position Cc which minimizes the distance error is calculated. Next, the position Cc is temporarily set to the value which minimizes the distance error, and this time, the distance f is made to vary. In this process, the distance f which minimizes the distance error is calculated. The distance f is temporarily set to the value which minimizes the distance error, and the position Cc is made to vary. In this process, the position Cc which minimizes the distance error is calculated. The position Cc is temporarily set to the value which minimizes the distance error, and the distance f is made to vary again. In this process, the distance f which minimizes the distance error is calculated. By repeating this process several times, it is possible to calculate the distance f and the position Cc which can minimize the distance error, and therefore the distance f and the position Cc can be optimized.

Thus, in the present embodiment, the calibration tool 102 including N spheres 106 at unknown specific relative positional intervals (unknown intervals) is mounted on the rotating table 120, and the spheres 106 disposed in the N places are parallelly moved a plurality of times (M times) without changing the specific relative positional interval. Then, before and after the parallel movement, the calibration tool 102 is irradiated with the X-ray 118, and the rotating table 120 is set to three rotation angles, where projected images of the calibration tool 102 are acquired.

In short, in the present embodiment, the rotation center position Cp of the rotating table 120 can be calculated with a series of very simple steps. Since the amount of the parallel movement is not particularly limited, a convenient amount of parallel movement can be performed, which makes it easy to acquire projected images. Furthermore, calibration can be performed by simple processing.

In the present embodiment, in the individual matrix calculation step, on the assumption that the X-ray source 116 and the X-ray image detector 124 parallelly move instead of the spheres 106 disposed in the N places, the moving position Xm of the X-ray source 116 is calculated for each N place on the basis of the individual projection matrix PPj, and the moving positions Xb of the spheres 106 in the N places are calculated on the basis of the moving position Xm of the X-ray source 116. Accordingly, arithmetic calculation becomes more facilitated, and the moving positions Xb of the spheres 106 in the N places can swiftly be calculated. Without being limited thereto, the moving positions Xb of the spheres 106 may be calculated directly from the amount of the parallel movement of the spheres 106 disposed in the N place.

In the present embodiment, in the coordinate integration step, the results of adding the moving positions Xb of the spheres 106 in the N places to each of the M table positions Dis(1 to M) are defined as modified moving positions Xl. From each of the centroid positions ImDis(1 to M)_Sphr_(1 to N) of the projected images of the spheres 106 in the N places and the modified moving positions Xl, the projection matrix P is calculated. Then, on the basis of the projection matrix P, the relative positions X(1 to N) of the spheres 106 in the N places are calculated. Accordingly, the arithmetic calculation itself is simple, so that calibration speed can be increased more. Without being limited thereto, the relative positions X(1 to N) of the spheres 106 may be calculated directly without calculating the projection matrix P.

In the present embodiment, since all the spheres 106 are mounted on only one plane in the calibration tool 102, the projective transformation matrix Hk is used as the first transformation matrix for projective transformation of the spheres 106 in the k-th rotational position Posk to the detection surface 124A of the X-ray image detector 124. Accordingly, the rotation center position Cp of the rotating table 120 can be calculated by using, as calculation targets, only four spheres 106, out of 12 spheres 106. This allows further reduction in calibration time. In the present embodiment, the rotation center position Cp of the rotating table 120 can be calculated extremely accurately by using not only the four spheres 106 but all the 12 spheres 106 as the targets of arithmetic calculation in each step.

In the present embodiment, the rotary axis Ax of the rotating table 120 is further calculated in the center position calculation step. Accordingly, even in the case where calibration of the rotary axis Ax of the rotating table 120 is first assumed to be unnecessary, it is possible to properly evaluate the necessity for calibration by comparing the rotary axis Ax with the result of actual calculation of the rotary axis Ax of the rotating table 120.

In the present embodiment, it is assumed in the position calculation step that the X-ray source 116 and the X-ray image detector 124 rotate instead of the rotating table 120. On this assumption, the absolute position Xs of the X-ray source 116 for each rotation at the predetermined angle α is calculated from the projective transformation matrix Hk, and the absolute positions Xa of the spheres 106 are calculated by performing coordinate transformation of the absolute position Xs of the X-ray source 116. In other words, instead of directly calculating the absolute positions Xa of the spheres 106, the absolute position Xs of the X-ray source 116 is calculated first. Consequently, the projective transformation matrix Hk is directly used. As a result, the calculation amount can be reduced, and swift calibration can be achieved. The present invention is not limited to this configuration. Instead, a method of directly calculating the absolute positions Xa of the spheres 106 may be used.

In the present embodiment, when the rotating table 120 is rotated three times or more at the predetermined angle α to calculate the absolute positions Xs of the X-ray source 116 in Q places, the distance f between the X-ray source 116 and the X-ray image detector 124 and the position Cc of the foot of the perpendicular from the X-ray source 116 to the X-ray image detector 124 are used as variables. Then, a distance error between the position on the locus Fs of a provisional true circle, obtained by fitting the absolute positions Xs of the X-ray source 116 in Q places calculated on the basis of the projective transformation matrix Hk (k=1 to Q) to a true circle, and the absolute position Xs of the X-ray source 116 in the Q places is evaluated. On the basis of the evaluation of the distance error, the distance f between the X-ray source 116 and the X-ray image detector 124 and the position Cc of the foot of the perpendicular from the X-ray source 116 to the X-ray image detector 124 are calculated. Therefore, in the case of calibrating the distance f between the X-ray source 116 and the X-ray image detector 124 and the position Cc of the foot of the perpendicular from the X-ray source 116 to the X-ray image detector 124, these values can be calculated, and more accurate calibration can be performed.

In the present embodiment, in the center position calculation step, the center position Cp of the locus Fb, obtained by fitting each of the changing absolute positions Xa(1 to N) of the spheres 106 to a true circle, is calculated, and the obtained center position Cp is set as the rotation center position Cp of the rotating table 120. In other words, by fitting the absolute positions to a true circle, the total number Q of rotational positions can be reduced, and the center position Cp can uniquely be calculated. However, the present invention is not limited to this configuration. The rotation center position Cp of the rotating table 120 may be calculated by other methods.

In the present embodiment, in the case of calculating the rotary axis Ax of the rotating table 120, the angle of inclination from the horizontal plane of the locus Fb obtained by fitting to a true circle is calculated, and the rotary axis Ax is calculated from the angle of inclination and the rotation center position Cp. Accordingly, the rotary axis Ax can be calculated with only one sphere 106. This makes it possible to simplify the step of calculating the rotary axis Ax and to perform the step in a short time. However, the present invention is not limited to this. For example, the locus Fb obtained by fitting to a true circle is calculated in each of the spheres 106, and the rotary axis Ax may be calculated on the basis of a shift from each of the center positions Cp.

In the present embodiment, the reference objects on the calibration tool 102 are the spheres 106. Accordingly, outlines of the spheres 106 are circular whichever direction their images are projected. It means that the spheres 106 have a shape, as a reference object, most easily identifiable by their images projected to the X-ray image detector 124. However, the present invention is not limited to this. The reference objects may be, for example, a polyhedron including a regular polyhedron and a deformed rhomb, and may have shapes including curved surfaces, such as an ellipsoid and a cone.

In the present embodiment, the positions of the feature points of the projected images of the spheres 106 that are reference objects are the centroid positions of the projected images. Since the projected images of the spheres 106 are circular, it is easy to calculate their centroid positions, and it is possible to calculate with less position error. However, the present invention is not limited to this configuration. The positions of the feature points of the projected images of the spheres 106 that are reference objects may be their center positions. Alternatively, when the reference objects are not spheres, but locally include characteristic recess portions or protruding portions, the characteristic recess portions and protruding portions are associated with the feature points of the projected images.

Specifically, in the present invention, it is possible to easily calculate the rotation center position Cp of the rotating table 120, on which an object to be measured is rotatably mounted, with a simple step, even when the calibration tool 102 is deformed due to secular change or the like.

In the foregoing embodiment, the projection matrix P is calculated by using the calculated modified moving positions Xl calculated in the coordinate integration step without change. However, the present invention is not limited to this. For example, according to the steps shown in FIG. 11, the host computer 128 may calculate the modified moving position Xl and the projection matrix P. In the description, the centroid position ImDisi_Sphr_j actually detected may simply be referred to as the centroid position ImDis_ij. The calculated centroid position CImDisi_Sphr_j may simply be referred to as the centroid position CImDis_ij (1≤i≤M, 1≤j≤N). The table position is referred to as Disi and the modified moving position is referred to as Xlj.

First, in the coordinate integration step, the calculated modified moving positions Xl and the calculated projection matrix P are set as initial values of the modified moving positions Xl and projection matrix P that are used as variables. In short, the modified moving positions Xl and the projection matrix P are converted into variables (step S80 of FIG. 11). The modified moving positions Xl and the projection matrix P calculated in the coordinate integration step are substituted into the variables as initial values.

Figure 11:
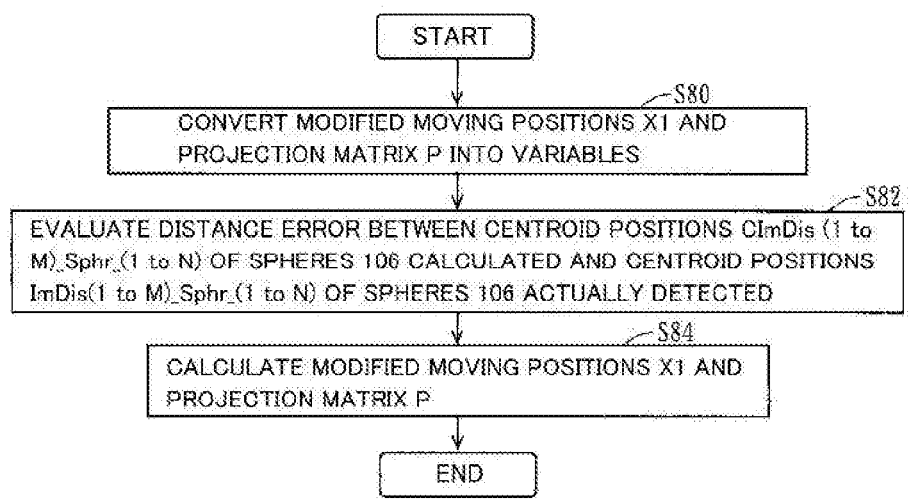
FIG. 11 is a detailed flowchart illustrating optimization of the relative positions of the spheres to be calculated in FIG. 4.

Next, a position error between the centroid positions CImDis(1 to M)_Sphr_(1 to N)(when the number of the spheres 106 is N in the M table positions Dis(1 to M)) of the projected images of the spheres 106 in the N places, which are calculated on the basis of the relationship between the modified moving positions Xl and the projection matrix P, and the centroid positions ImDis(1 to M)_Sphr_(1 to N) of the projected images of the spheres 106 in the N places, which are actually detected, is evaluated (step S82 of FIG. 11).

Here, the calculated centroid positions ImDis_ij can be expressed by an expression (9).

$$\text{ImDis}\_ij = P^*(Disi + Xlj) \quad (9)$$

Similarly, the actually detected centroid position CImDis_ij can be expressed by an expression (10).

$$\text{CImDis}\_ij = P^*(Disi + Xlj) \quad (10)$$

From the expressions (9) and (10), an evaluation function EV to calculate the position error can be obtained in an expression (11).

$$EV = \Sigma(\text{ImDis}\_ij - \text{CImDis}\_ij)^2 \quad (11)$$

Next, evaluation is performed using the evaluation function EV of the expression (11) so as to minimize the position error. This makes it possible to calculate the modified moving positions Xl and the projection matrix P more precisely (step S84 of FIG. 11).

In the foregoing embodiment, in the coordinate integration step, the relative positions X(1 to N) of the spheres 106 in the N places are calculated, and the calculated relative positions X(1 to N) are used without change. However, the present invention is not limited to this. For example, the rotating table 120 is rotated a plurality of times at a specific angle, and the front-stage feature position calculation step to the coordinate integration step are repeatedly executed. Then, an average of the plurality of relative positions X(1 to N) obtained by the repeated execution may be calculated, or the table positions Dis(1 to N) obtained when the steps are repeatedly executed next time may be associated with the relative positions X(1 to N) calculated immediately before. In this case, the relative positions X(1 to N) can be calculated still more precisely.

In the foregoing embodiment, all the spheres 106 are mounted on only one plane in the calibration tool 102. However, the present invention is not limited to this. For example, the spheres 106 may be mounted on the calibration tool 102 three-dimensionally, instead of all the spheres 106 being mounted on one plane. In that case, a projection matrix Pk substantially identical to the expression (3) is used instead of the projective transformation matrix Hk expressed in the expression (7). In this case, even if the plane accuracy of the calibration tool 102 is not good, accurate calibration can be performed by using the projection matrix Pk.

Although the number of the spheres 106 is at least four in the foregoing embodiment, the present invention is not limited to this. For example, the calibration tool 102 may be configured such that there is one sphere 106 and the one sphere 106 is moved to and disposed in at least four places.

The present invention is widely applicable to calibration of the X-ray measuring devices.

It should be apparent to those skilled in the art that the above-described embodiments are merely illustrative which represent the application of the principles of the present invention. Numerous and varied other arrangements can be readily devised by those skilled in the art without departing from the spirit and the scope of the present invention.

The invention claimed is:

1. A calibration method of an X-ray measuring device configured to measure a three-dimensional shape of an object to be measured using an X-ray,
the X-ray measuring device including an X-ray source that generates the X-ray, a rotating table on which the object to be measured is rotatably mounted, and an X-ray image detector that detects the X-ray passing through the object to be measured,
the method comprising:
mounting on the rotating table a calibration tool that allows disposition of reference objects in N places (N≥4) at specific relative positional intervals, the reference objects having a shape that is identifiable by projected images on the X-ray image detector;
parallelly moving the reference objects disposed in the N places a plurality of times without changing the specific relative positional intervals of the reference objects, irradiating the calibration tool with the X-ray before and after the parallel movement, and identifying positions of feature points of projected images of the reference objects in the N places from an output of the X-ray image detector;
calculating an individual transformation matrix for each of the reference objects in the N places from the positions before and after the parallel movement and the corresponding positions of the feature points of the projected images of the reference objects in the N places, the individual transformation matrix being used for projective transformation of the reference objects to a detection surface of the X-ray image detector;

calculating moving positions of the reference objects in the N places on a basis of the individual transformation matrix;

adding moving positions of the reference objects in the N places to each of the positions before and after the parallel movement, and calculating the specific relative position intervals of the reference objects in the N places;

irradiating the calibration tool with the X-ray, and identifying positions of feature points of projected images of the reference objects in the N places from an output of the X-ray image detector;

calculating a first transformation matrix from the positions of the feature points of the projected images of the reference objects in the N places and the specific relative positional intervals, the first transformation matrix being used for projective transformation of the reference objects onto a detection surface of the X-ray image detector;

rotating the rotating table twice or more at a predetermined angle, and repeating execution of irradiating the calibration tool with the X-ray, and identifying positions of the feature points of the projected images of the reference objects in the N places from the output of the X-ray image detector, to calculating the first transformation matrix from the positions of the feature points of the projected images of the reference objects in the N places and the specific relative positional intervals, the first transformation matrix being used for projective transformation of the reference objects onto the detection surface of the X-ray image detector;

calculating absolute positions of the reference objects for each rotation at the predetermined angle on a basis of the first transformation matrix; and calculating a rotation center position of the rotating table from change in the absolute positions of the reference objects caused by rotation of the rotating table.

2. The calibration method of an X-ray measuring device according to claim 1, wherein in the calculating of the individual transformation matrix, on assumption that the X-ray source and the X-ray image detector are parallelly moved instead of the reference objects disposed in the N places, a moving position of the X-ray source is calculated for each N place on a basis of the individual transformation matrix, and the moving positions of the reference objects in the N places are calculated on a basis of the moving position of the X-ray source.

3. The calibration method of an X-ray measuring device according to claim 1, wherein in the adding of the moving positions of the reference objects, results of adding the moving positions of the reference objects in the N places to the positions before and after the parallel movement are defined as modified moving positions, and from the positions of the feature points of the projected images of the reference objects in the N places and the modified moving positions, a second transformation matrix is calculated so as to calculate the specific relative position intervals of the reference objects in the N places, the second transformation matrix being used for projective transformation of the reference objects onto the detection surface of the X-ray image detector.

4. The calibration method of an X-ray measuring device according to claim 3, wherein in the adding of the moving positions of the reference objects, the calculated modified moving positions and the calculated second transformation matrix are set as initial values of the modified moving positions and the second transformation matrix that are used as variables, and a position error between the positions of the feature points of the projected images of the reference objects in the N places, calculated on a basis of relationship between the modified moving positions and the second transformation matrix, and positions of the feature points of the projected images of the reference objects in the N places that are actually detected is evaluated so as to calculate the modified moving positions and the second transformation matrix.

5. The calibration method of an X-ray measuring device according to claim 1, wherein the rotating table is rotated a plurality of times at a specific angle, the parallelly moving of the reference objects disposed in the N places, to the adding the moving positions of the reference objects, are repeatedly executed, and an average of the plurality of specific relative position intervals obtained by the repeated execution is calculated, or positions before and after the parallel movement when the repeated execution is performed next time are associated with the specific relative position intervals calculated immediately before.

6. The calibration method of an X-ray measuring device according to claim 1, wherein when all the reference objects are mounted on only one plane in the calibration tool, the first transformation matrix is defined as a projective transformation matrix, and when the reference objects are mounted three-dimensionally, the first transformation matrix is defined as a projection matrix.

7. The calibration method of an X-ray measuring device according to claim 1, wherein in the calculating of the rotation center position of the rotating table, a rotary axis of the rotating table is further calculated.

8. The calibration method of an X-ray measuring device according to claim 1, wherein in the calculating of the absolute positions of the reference objects, on an assumption that the X-ray source and the X-ray image detector rotate instead of the rotating table, absolute positions of the reference objects are calculated by calculating an absolute position of the X-ray source for each rotation at the predetermined angle on a basis of the first transformation matrix and by transforming the absolute position of the X-ray source into coordinates.

9. The calibration method of an X-ray measuring device according to claim 8, wherein when the absolute position of the X-ray source is calculated by rotating the rotating table three times or more at the predetermined angle, a distance between the X-ray source and the X-ray image detector and a position of a foot of a perpendicular from the X-ray source to the X-ray image detector are converted into variables, and a distance error between a position on a locus of a provisional true circle and the absolute position of the X-ray source is evaluated so as to calculate the distance between the X-ray source and the X-ray image detector and a position of the foot of the perpendicular from the X-ray source to the X-ray image detector, the provisional true circle being obtained by fitting the absolute positions of the X-ray source calculated on a basis of the first transformation matrix to a true circle.

10. The calibration method of an X-ray measuring device according to claim 1, wherein
in the calculating of the rotation center position of the rotating table, a center position of a locus obtained by fitting change in the absolute positions of the reference objects to a true circle is calculated, and the calculated center position is defined as the rotation center position of the rotating table.

11. The calibration method of an X-ray measuring device according to claim 10, wherein
in calculation of the rotary axis of the rotating table, an angle of inclination from a horizontal plane of the locus is further calculated, and the rotary axis is calculated from the angle of inclination and the rotation center position.

12. The calibration method of an X-ray measuring device according to claim 1, wherein
the reference objects are each a sphere.

13. The calibration method of an X-ray measuring device according to claim 1, wherein
the positions of the feature points of the projected images of the reference objects are centroid positions of the projected images.

* * * * *